May 16, 1950     O. J. ALVAREZ     2,508,086
CONVEYER SYSTEM

Filed Dec. 21, 1946     2 Sheets—Sheet 1

INVENTOR.
Octavio Jose Alvarez
BY

May 16, 1950 — O. J. ALVAREZ — 2,508,086
CONVEYER SYSTEM
Filed Dec. 21, 1946 — 2 Sheets-Sheet 2
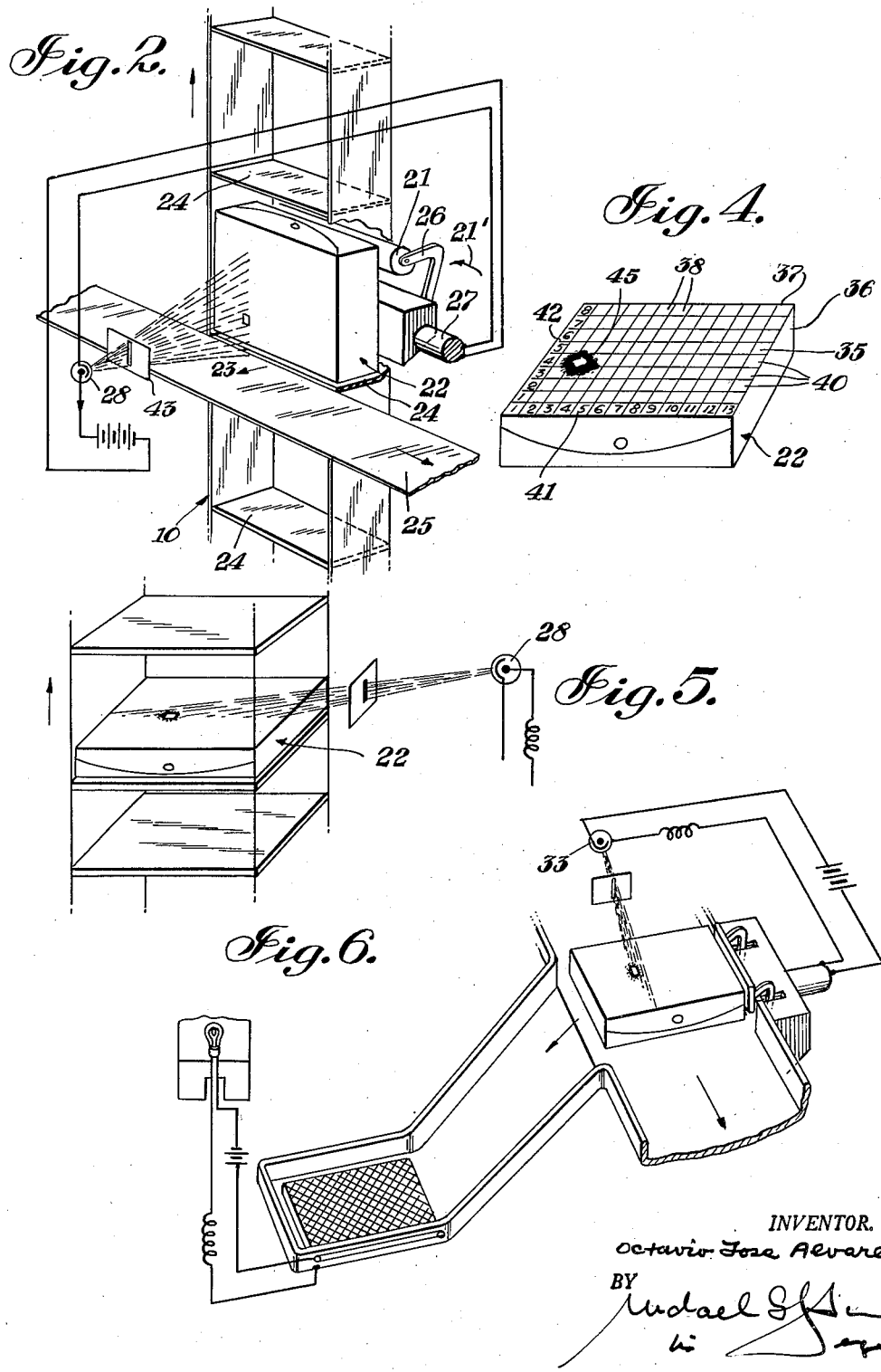
INVENTOR.
Octavio Jose Alvarez Patented May 16, 1950

2,508,086

UNITED STATES PATENT OFFICE 2,508,086

CONVEYER SYSTEM

Octavio Jose Alvarez, New York, N. Y., assignor to Alvarez Patent Corporation, New York, N. Y.

Application December 21, 1946, Serial No. 717,771

6 Claims. (Cl. 198—38)

My present invention relates to conveyor systems and more particularly to a conveyor system provided with automatic delivering means.

It is an object of my present invention to provide a conveyor system combined with delivering means which are actuated by influencing means removably provided on or attached to the transported objects.

It is another object of my present invention to provide conveyor systems which can be operated and combined with automatic delivering means in a very simple and efficient manner.

It is a further object of this invention to provide a mail distributing system which can be established simply in any desired building so as to deliver the mail to the varous rooms and parts of the building according to various indications provided on the mail container in which the mail is transported.

Finally, it is also an object of my present invention to provide removing means for removing a transported object from a conveyor in such a manner that these removing means are operated by indications provided on the object itself.

With the above objects in view, my present invention mainly consists in the provision of a plurality of removing means in a conveyor system arranged and constructed so as to be photoelectrically actuated by influencing means having a light intensity varying effect and removably provided, whenever desired, on the object transported by the conveyor system.

More particularly, my present invention consists in a conveyor system comprising in combination conveyor means for transporting an object along a predetermined path, a plurality of removing means arranged spaced from each other along this conveyor means so that each of these removing means is adapted to remove the transported object during its transportation by the conveyor means from the same, a plurality of operating means each associated with one of the above mentioned removing means and adapted to operate the same so as to remove the transported object from the conveyor means when the object is passing along the removing means, influencing means adapted to be removably provided on the transported object on different surface portions thereof corresponding each to one of the above mentioned removing means, and a plurality of actuating means each combined with one of the above mentioned operating means so as to be adapted to actuate the same and thus cause operation of the corresponding removing means; in accordance with my present invention, each of these actuating means is arranged and constructed so as to be actuated by the above defined influencing means only when the same is removably provided on that surface portion of the object which corresponds to that removing means which is actuated by the respective actuating means.

In accordance with a preferred embodiment of my present invention, the actuating means mentioned above are of the photoelectric type so as to be adapted to photoelectrically actuate the operating means when the intensity of light impinging upon the photoelectric actuating means is varying; thus, each of these photoelectric actuating means is causing operation of the corresponding removing means in case the intensity of light impinging upon it is varying.

Preferably, I incorporate into each of the above defined photoelectric actuating means a photoelectric cell which is arranged and constructed so as to be influenced by light intensity variations caused by the influencing means only when the same is removably provided on that surface portion of the transported object which corresponds to that removing means which is photoelectrically actuated by the respective photoelectric actuating means.

As set forth above, the influencing means have to have a light intensity varying effect. This can be obtained, for instance, by constructing the influencing means so that they have a substantially greater or substantially smaller light reflecting capacity than the surrounding surface of the object. Of course, it is also possible to use influencing means having a light emitting effect, e. g. consisting of a small bulb connected with a source of electric current.

In accordance with a particularly preferred embodiment of my present invention, the transported object has an at least substantially flat surface which is parallel to the direction of transportation of the object and consists of a plurality of strip-shaped surface portions which are also parallel to the direction of transportation; each of these parallel strip-shaped surface portions corresponds to one of the above defined removing means. In this case, each of the photoelectric cells mentioned above is arranged and constructed so as to be influenced by light intensity variations caused by the influencing means only when the same is removably provided within that strip-shaped surface portion of the object which corresponds to that removing means which is photoelectrically actuated by the respective photoelectric actuating means.

A conveyor system of the above type consists of one conveyor and several removing means arranged along the same. However, it is often desirable to provide a conveyor system which includes one main conveyor, e. g. a vertical conveyor, and a plurality of secondary, e. g. horizontal conveyors, fed by the main conveyor. A conveyor system of this type constructed in accordance with my present invention is adapted to deliver an object to any removing means at any desired point of the secondary conveyors according to indications provided on the transported object itself. For this purpose, I provide a combined conveyor system comprising in combination a great number of cooperating elements, namely a first conveyor for transporting an object along a first predetermined path, a plurality of first removing means arranged spaced from each other along this first conveyor as explained above, a plurality of second conveyors each associated with one of the above mentioned first removing means and adapted to receive the transported object removed by the same and to transport it in a direction normal to the direction of transportation of the first conveyor mentioned above, a plurality of second removing means arranged spaced from each other along each of the above defined second conveyor means as explained above, a plurality of first operating means each associated with one of the first removing means and a plurality of second operating means each associated with one of the second removing means and adapted to operate the same as clearly explained above, a plurality of indicating square-shaped surface portions on the transported object each forming part of one of a plurality of first strip-shaped surface portions corresponding each to one of the above defined first operating means and being parallel to the direction of transportation of said object on said first conveyor and forming also part of one of a plurality of second strip-shaped surface portions corresponding each to one of the above defined second operating means and being parallel to the direction of movement of the transported object on said second conveyors, each of these square-shaped surface portions thus corresponding to one particular first removing means and one particular second removing means, a plurality of first actuating means each associated with one of the first operating means and a plurality of second actuating means each associated with one of said second operating means and adapted to operate the same when the intensity of light emitted or reflected by that strip-shaped surface portion of the object which corresponds to the removing means actuated by the respective actuating means is varied, and influencing means having a light intensity varying effect and adapted to be removably provided on the transported object within any one of the above defined square-shaped surface portions of the same.

Provision of influencing means of the type above defined has a dual effect: First it influences that first actuating means which actuates that first removing means which corresponds to that first strip-shaped surface portion which includes the square-shaped surface portion within which the influencing means is provided; furthermore, the influencing means will also influence that second actuating means which actuates that second removing means which corresponds to that second strip-shaped surface portion which includes the square-shaped surface portion within which the influencing means is provided.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a partial perspective view of the main conveyor;

Fig. 4 is a perspective view of a transported object, e. g. a mail container;

Fig. 5 is a partial perspective view of a modified main conveyor similar to the one shown in Fig. 2; and Fig. 6 is a partial perspective view of a modified secondary conveyor, similar to the one shown in Fig. 3.

Figure 1:
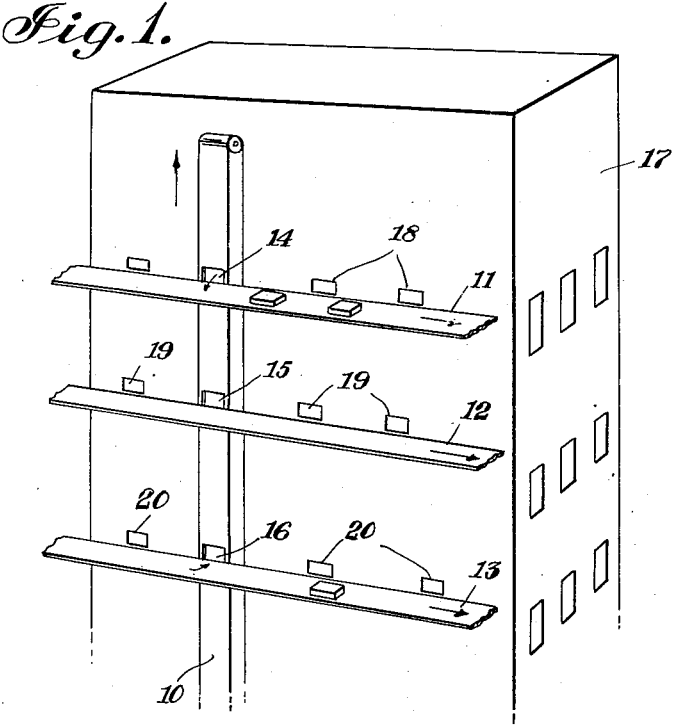
Fig. 1 is a general perspective view of a conveyor system of the type proposed by me.

My new conveyor system is preferably adapted for distribution of packages, e. g. main containers in buildings and will therefore be described and shown as used for this purpose. However, I wish to stress that this description is not intended to limit the present invention to such mail distributing arrangements, but that my invention is adapted for distribution of packages and other objects too.

Similarly, my present invention might be used not only in buildings where vertical and horizontal conveyors are combined, but also in factories where systems of hrizontal conveyors are combined with each other.

In the arrangement shown in the drawings, my conveyor system consists of a main conveyor 10 which is arranged vertically, and a plurality of conveyors 11, 12 and 13 arranged horizontally as shown. The construction of such conveyors is well known to everyone skilled in this art and thus, does not have to be shown or explained in detail.

The main problem in connection with such conveyor systems is to transfer the mail container from the vertical conveyor 10 to the particular selected horizontal conveyor, and then to remove from this horizontal conveyor the mail container wherever needed.

To obtain this object and solve this problem, I provide along the vertical conveyor 10 a plurality of removing means 14, 15 and 16, each corresponding to one of the horizontal conveyors 11, 12 and 13, respectively. Thus, the removing means 14 are adapted to transfer the transported mail container from the main conveyor 10 to the horizontal conveyor 11; similarly, the removing means 15 transfer the mail container from conveyor 10 to conveyor 12, and finally, the removing means 16 transfer the transported mail container from the main conveyor 10 to the horizontal conveyor 13.

In addition to above removing means 14, 15 and 16, I provide along each of the horizontal conveyors 11, 12 and 13 additional removing means arranged in the rooms on the various floors of the building 17: Thus, I provide along the conveyor 11 a plurality of removing means 18, along the horizontal conveyor 12 a plurality of removing means 19, and along the horizontal conveyor 13 a plurality of removing means 20.

Figure 3:
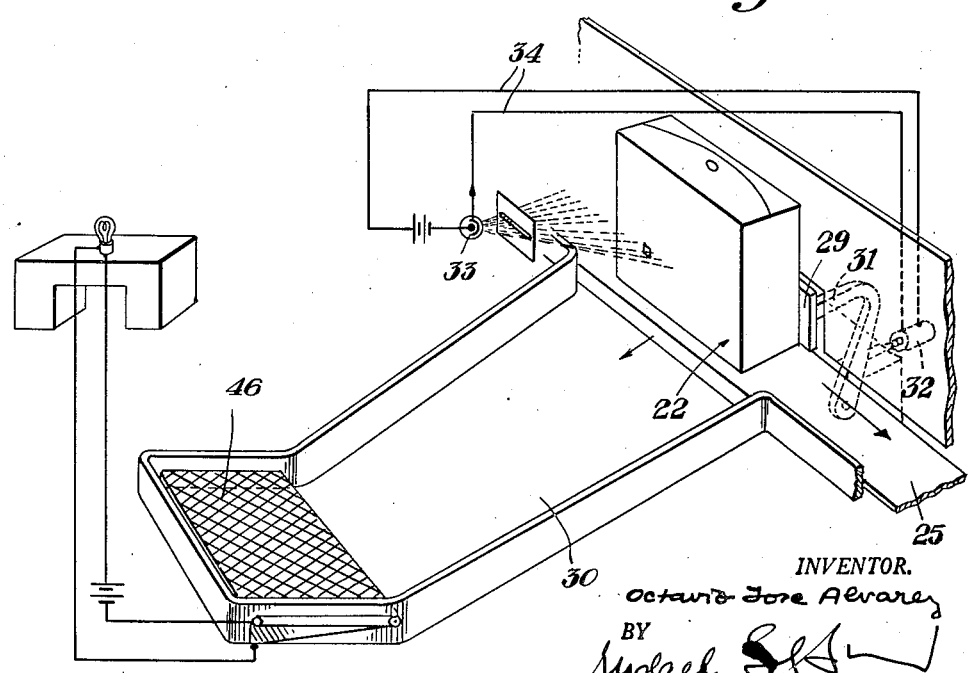
Fig. 3 is a partial perspective view of a secondary conveyor.

To properly actuate each of the above described removing means, the same are constructed as shown in Figs. 2 and 3:

Each of the removing means 14, 15 and 16 consists, as shown in Fig. 2, of a pivoted pushing member 21 adapted to turn in direction of arrow 21' and thereby slide the mail container 22 in direction of arrow 23 from one of the supporting boards 24 of the vertical conveyor 10 on to a horizontal conveyor belt 25 forming part of each of the conveyors 14, 15 and 16.

The pivoted pushing member 21—which serves as "moving means" of the type defined above and in the following claims—is combined with actuating means which include as main elements a lever 26 secured to the pushing member 21, a solenoid arrangement 27 adapted when energized to turn when energized this lever in direction of arrow 21', and a photoelectric cell 28 adapted to control solenoid 27 when the intensity of light impinging upon the cell varies. I wish to note in this connection that such photoelectric actuating means per se are well known for many purposes, and, therefore, they are not described or shown in detail. They might operate, i. e. turn lever 26 either by increase or decrease of the intensity of light impinging upon cell 28.

The removing and actuating means arranged along each of the horizontal conveyors 11, 12 and 13 are substantially identical to the removing and actuating means described above: Each of them consists, as shown in Fig. 3, of a pivoted pushing member 29 adapted to slide the mail container 22 off the horizontal conveyor belt 25 into the stationary chute 30, a lever arm 31 secured to this pushing member 29, a solenoid arrangement 32 and a photoelectric cell 33 connected with solenoid 32 by conductor 34 as described above in connection with the arrangement shown in Fig. 2. Each of these combined removing and actuating means is adapted to move the mail container 22 into the corresponding chute 30 when the intensity of light impinging upon the photoelectric cell 33 is varied.

It is one of the main objects of my present invention to obtain the necessary intensity variations of the light impinging upon the photoelectric cells 28 and 33 in the required sequence and at the required moments. Thus, for instance, if it is desired to transfer the mail container 22 from the vertical conveyor 10 to the horizontal conveyor 11, it is necessary to operate the pushing member 20 forming part of the removing means 14 exactly at the moment when the mail container 22 passes conveyor 11. Similarly, if it is desired to remove thereafter the mail container 22 from conveyor 11 by one particular removing means 18, the same has to be operated exactly at the moment the main container passes along it.

To obtain this object, I provide as shown in Fig. 4 on the mail container 22 a flat front face 35 reaching to the bottom face 36 of the container and forming with the same the front edge 37.

On this flat front face 35, I provide a plurality of square-shaped surface portions 38. Each of these square-shaped surface portions forms part of one of a plurality of so-called first strip-shaped surface portions 39 which are parallel to the direction of transportation of the container 22 when the same is properly placed on conveyor 10; each of the square-shaped surface portions 38 forms, however, also part of one of a plurality of so-called second strip-shaped surface portions 40 which are parallel to the direction of transportation of container 22 on the horizontal conveyors 11, 12 and 13.

Along the edges of the container I might provide indications, namely along edge 41 floor indications, corresponding to the horizontal conveyors 11, 12 and 13, and along edge 42 room indications, corresponding to the removing means 18, 19 and 20 along the horizontal conveyors 11, 12 and 13. The purpose of these indications will become clear from the following description.

Each of the photoelectric cells 28 is combined with a shutter 43 arranged so that only light reflected by one of the strip-shaped surface portions 39 is impinging upon cell 28. Thus, assumed that conveyor 13 is arranged on the second floor, the shutter 43 is combined with the photoelectric cell 28 forming part of the actuating means operating the removing means 16 and is arranged so that this cell 28 is influenced only by variations of the light reflected by the strip-shaped surface portion 39 indicated in Fig. 4 with floor number two. Similarly, shutter 43 combined with photoelectric cell 28 forming part of the actuating means operating the removing means 15 is arranged so that the cell is influenced only by light variations of the strip-shaped surface portion 39 indicated with floor number three.

Finally, the shutter 43 combined with the photoelectric cell 28 forming part of the actuating means operating the removing means 14 is arranged so that the cell is influenced only by intensity variations of the light reflected by the strip-shaped surface portion 39 indicated in Fig. 4 with number four. Each following floor—if there are any—corresponds to one of the following strip-shaped surface portions 39 as explained above.

In the same manner as described above in connection with the strip-shaped surface portions 39, each of the photoelectric cells 33 is combined with a shutter 44 arranged so that each cell 33 is influenced only by light intensity variations of one of the strip-shaped surface portions 40. Thus, for instance, on each of the floors, the first of the removing means 18, or 19, or 20 is operated only if the light intensity of the strip-shaped surface portion 40 indicated with room number one is varied; the second removing means is operated when the light intensity of the strip-shaped surface portion 40 indicated with room number two is varied; the third, fourth and the following removing means are operated in the same manner.

Now, in order to obtain the necessary light variations for proper operation of the selected first and second, i. e. floor and room removing means, it is only necessary to provide on the front face 35 within the proper square-shaped surface portion 38 of the same light intensity varying means; these means are called in above description and the following claims "influencing means." I have found that the necessary light intensity variations might be obtained by providing a blackboard-like front face 35 and making within the desired square 38 a white chalk mark 45 which causes the desired light variations.

My new conveyor system operates as follows:

Assumed, it is desired to deliver the mail container 22 from the first floor to room number four on the third floor, then the dispatcher will make the chalk mark 45 as shown in Fig. 4, namely, within that square-shaped surface portion 38 of the front face 35 which is common to the strip-shaped surface portion 39 bearing floor number three and the strip-shaped surface portion 40 bearing room number four: The strip-shaped surface portion 39 marked floor number three has been selected as it is desired to deliver the container on the third floor, and the strip-shaped surface portion 40 marked room number four has been selected as it is desired to deliver the container in the fourth room on the third floor.

Then the container 22 is placed on one of the supporting boards 24 of the vertical conveyor 10 and moved upwards. It passes the removing means on the second floor without being ejected by the same as the chalk mark 45 will not influence the photoelectric cell 28 forming part of the actuating means on the second floor. When the container reaches the third floor, the photoelectric cell arranged on this floor will scan the strip-shaped surface portion 39 bearing the floor number three and will be influenced by the chalk mark 45 provided in the same. This will result in actuation of the corresponding solenoid and operation of the removing means 15 which will push the container 22 on the horizontal conveyor 12.

On this horizontal conveyor 12 the container 22 will travel until it reaches room number four, which is provided with removing and actuating means adapted to be operated by intensity variations of the light reflected by the strip-shaped surface portion 40 bearing room number four on the front face 35 of the container 22. As the chalk mark 45 is provided within this strip-shaped surface portion, it will actuate the removing means 19 provided in room number four on the third floor and cause removal of the container from the conveyor 12. The container will slide down chute 30 onto the tiltable support 46 which is combined with an electrical lamp 47 automatically lighted by downward tilting of the support so as to indicate delivery of the mail container 22.

The modified actuating means shown in Figs. 5 and 6 are very similar to the ones described above; the only difference is that the container 22 is tranported in horizontal instead of in vertical position and the photoelectric cells 28 and 33 are arranged on the side instead of in front of the conveyors.

It will be understood that each of the elements described above, or two or more together, may also find a useful application in other types of conveyor systems, differing from the types described above.

While I have illustrated and described the invention as embodied in conveyor systems for distribution of mail containers, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A conveyor system comprising a combination first conveyor means for transporting an object having a straight edge along a predetermined path being parallel to said edge of said object; a plurality of first removing means arranged spaced from each other along said predetermined path of said first conveyor means so that each of said first removing means is adapted to remove said object during its transportation by said first conveyor means from the same; a plurality of second conveyor means each associated with one of said first removing means and adapted to transport said object along a predetermined path being normal to said edge of said object when said object is removed by the corresponding first removing means from said first conveyor means; a plurality of first operating means each associated with one of said first removing means and adapted to operate the same so as to remove said object from said first conveyor means when passing along said first removing means; a plurality of second removing means arranged spaced from each other along said predetermined path of each of said second conveyor means so that each of said second removing means is adapted to remove said object during its transportation by said second conveyor means from the same; a plurality of second operating means each associated with one of said second removing means and adapted to operate so as to remove said object from said second conveyor means when passing along said second removing means; influencing means adapted to be removably provided on said object on different surface portions thereof, each of said surface portions corresponding to one of said first removing means and to one of said second removing means; a plurality of first actuating means each combined with one of said first operating means so as to be adapted to actuate the same and thus cause operation of the corresponding first removing means, each of said first actuating means being arranged and constructed so as to be actuated by said influencing means only when the same is removably provided on that surface portion of said object which corresponds to that first removing means which is actuated by the respective first actuating means; and a plurality of second actuating means each combined with one of said second operating means so as to be adapted to actuate the same and thus cause operation of the corresponding second removing means, each of said second actuating means being arranged and constructed so as to be actuated by said influencing means only when the same is removably provided on that surface portion of said object which corresponds to that second removing means which is actuated by the respective second actuating means.

2. A conveyor system comprising in combination first conveyor means for transporting an object having a straight edge along a predetermined path being parallel to said edge of said object; a plurality of first removing means arranged spaced from each other along said predetermined path of said first conveyor means so that each of said first removing means is adapted to remove said object during its transportation by said first conveyor means from the same; a plurality of second conveyor means each associated with one of said first removing means and adapted to transport said object along a predetermined path being normal to said edge of said object when said object is removed by the corresponding first removing means from said first conveyor means; a plurality of first operating means each associated with one of said first removing means and adapted to operate the same so as to remove said object from said first conveyor means when passing along said first removing means; a plurality of second removing means arranged spaced from each other along said predetermined path of each of said second conveyor means so that each of said second removing means is adapted to remove said object during its transportation by said second conveyor means from the same; a plurality of second operating means each associated with one of said second removing means and adapted to operate so as to remove said object from said second conveyor means when passing along said second removing means; influencing means having a light intensity varying effect and adapted to be removably provided on said object on different surface portions thereof, each of said surface portions corresponding to one of said first removing means and to one of said second removing means; a plurality of first actuating means each including a photoelectric cell and combined with one of said first operating means so as to be adapted to actuate the same when the intensity of light impinging upon said photoelectric cell is increased and thus cause in case of such increase of intensity of the impinging light operation of the corresponding first removing means, each of said photoelectric cells being arranged and constructed so as to be influenced by light intensity variations caused by said influencing means only when the same is removably provided on that surface portion of said object which corresponds to that first removing means which is actuated by the respective first actuating means; and a plurality of second actuating means each including a photoelectric cell and combined with one of said second operating means so as to be adapted to actuate the same when the intensity of light impinging upon said photoelectric cell is increased and thus cause in case of such increase of intensity of the impinging light operation of the corresponding second removing means, each of said photoelectric cells being arranged and constructed so as to be influenced by light intensity variations caused by said influencing means only when the same is removably provided on that surface portion of said object which corresponds to that second removing means which is photoelectrically actuated by the respective second photoelectric actuating means.

3. A conveyor system comprising in combination first conveyor means for transporting an object having a straight edge along a predetermined path being parallel to said edge of said object; a plurality of first removing means arranged spaced from each other along said path of said first conveyor means so that each of said first removing means is adapted to remove said object during its transportation by said first conveyor means from the same; a plurality of second conveyor means each associated with one of said first removing means and adapted to transport said object along a path being normal to said edge of said object when said object is removed by the corresponding first removing means from said first conveyor means; a plurality of first operating means each associated with one of said first removing means and adapted to operate the same so as to remove said object from said first conveyor means when passing along the corresponding first removing means; a plurality of second removing means arranged spaced from each other along the path of each of said second conveyor means so that each of said second removing means is adapted to remove said object during its transportation by said second conveyor means from the same; a plurality of second operating means each associated with one of said second removing means and adapted to operate the same so as to remove said object from said second conveyor means when passing along the corresponding second removing means; influencing means having a light intensity varying effect and adapted to be removably provided on said object within any one of the plurality of square-shaped surface portions each of which forms part of one of a plurality of first strip-shaped surface portions each corresponding to one of said first operating means and being parallel to said edge of said object and forms also part of one of a plurality of second strip-shaped surface portions each corresponding to one of said second operating means and being normal to the direction of said edge of said object, each of said square-shaped surface portions thus corresponding to one of said first removing means and one of said second removing means; a plurality of first actuating means each including a photoelectric cell and combined with one of said first operating means so as to be adapted to actuate the same when the intensity of light impinging upon said photoelectric cell varies and thus cause in case of such variation of the intensity of the impinging light operation of the corresponding first removing means; each of said photoelectric cells being arranged and constructed so as to be influenced by light intensity variations caused by said influencing means only when the same is removably provided within a square-shaped surface portion forming part of that first strip-shaped surface portion of said object which corresponds to that first operating means which is actuated by that first actuating means which includes the respective photoelectric cell; and a plurality of second actuating means each including a photoelectric cell and combined with one of said second operating means so as to be adapted to actuate the same when the intensity of light impinging upon said photoelectric cell varies and thus cause in case of such variation of the intensity of the impinging light operation of the corresponding second removing means; each of said photoelectric cells being arranged and constructed so as to be influenced by light intensity variations caused by said influencing means only when the same is removably provided within a square-shaped surface portion forming part of that second strip-shaped surface portion of said object which corresponds to that second operating means which is actuated by that second actuating means which includes the respective photoelectric cell.

4. A conveyor system comprising in combination first conveyor means for transporting an object along a first predetermined path; a plurality of first removing means arranged spaced from each other along said path of said first conveyor means so that each of said first removing means is adapted to remove said object during its transportation by said first conveyor means from the same; a plurality of second conveyor means each associated with one of said first removing means and adapted to transport said object along one of a plurality of second predetermined paths being normal to said first predetermined path when said object is removed by the corresponding first removing means from said first conveyor means; a plurality of first operating means each associated with one of said first removing means and adapted to operate the same so as to remove said object from said first conveyor means when passing along the corresponding first removing means; a plurality of second removing means arranged spaced from each other along the path of each of said second conveyor means so that each of said second removing means is adapted to remove said object during its transportation by said second conveyor means from the same; a plurality of second operating means each associated with one of said second removing means and adapted to operate so as to remove said object from said second conveyor means when passing along the corresponding second removing means; a plurality of indicating square-shaped surface portions on said object each of which forms part of one of a plurality of first strip-shaped surface portions each corresponding to one of said first operating means and being parallel to said first conveyor means and forms also part of one of a plurality of second strip-shaped surface portions each corresponding to one of said second operating means and being parallel to said second conveyor means, each of said square-shaped surface portions thus corresponding to one of said first removing means and one of said second removing means; a plurality of first actuating means each including a photoelectric cell and combined with one of said first operating means so as to be adapted to actuate the same when the intensity of light impinging upon said photoelectric cell varies and thus cause in case of such variation of the intensity of the impinging light operation of the corresponding first removing means, each of said photoelectric cells being arranged and constructed so as to be influenced by light intensity variations within a square-shaped surface portion forming part of that first strip-shaped surface portion of said object which corresponds to that first operating means which is actuated by that first actuating means which includes the respective photoelectric cell; a plurality of second actuating means each including a photoelectric cell and combined with one of said second operating means so as to be adapted to actuate the same when the intensity of light impinging upon said photoelectric cell varies and thus cause in case of such variation of the intensity of the impinging light operation of the corresponding second removing means, each of said photoelectric cells being arranged and constructed so as to be influenced by light intensity variations within a square-shaped surface portion forming part of that second strip-shaped surface portion of said object which corresponds to that second operating means which is actuated by that second actuating means which includes the respective photoelectric cell; and influencing means having a light intensity varying effect and adapted to be removably provided on said object within any one of said plurality of square-shaped surface portions.

5. A conveyor system comprising in combination a vertical conveyor for transporting an object along a first predetermned path; a plurality of first removing means arranged spaced from each other along said path of said vertical conveyor so that each of said first removing means is adapted to remove said object during its transportation by said vertical conveyor from the same; a plurality of horizontal conveyors each associated with one of said first removing means and adapted to transport said object along one of a plurality of second predetermined paths being normal to said first predetermined path when said object is removed by the corresponding first removing means from said vertical conveyor; a plurality of first operating means each associated with one of said first removing means and adapted to operate the same so as to remove said object from said vertical conveyor when passing along the corresponding first removing means; a plurality of second removing means arranged spaced from each other along the path of each of said horizontal conveyors so that each of said second removing means is adapted to remove said object during its transportation by said horizontal conveyors from the same; a plurality of second operating means each associated with one of said second removing means and adapted to operate so as to remove said object from said horizontal conveyors when passing along the coresponding second removing means; a plurality of indicating square-shaped surface portions on said object each of which forms part of one of a plurality of first strip-shaped surface portions each corresponding to one of said first operating means and being parallel to said vertical conveyor and forms also part of one of a plurality of second strip-shaped surface portions each corresponding to one of said second operating means and being parallel to said horizontal conveyor, each of said square-shaped surface portions thus corresponding to one of said first removing means and one of said second removing means; a plurality of first actuating means each including a photoelectric cell and combined with one of said first operating means so as to be adapted to actuate the same when the intensity of light impinging upon said photoelectric cell varies and thus cause in case of such variation of the intensity of the impinging light operation of the corresponding first removing means, each of said photoelectric cells being arranged and constructed so as to be influenced by light intensity variations within a square-shaped surface portion forming part of that first strip-shaped surface portion of said object which corresponds to that first operating means which is actuated by that first actuating means which includes the respective photoelectric cell; a plurality of second actuating means each including a photoelectric cell and combined with one of said second operating means so as to be adapted to actuate the same when the intensity of light impinging upon said photoelectric cell varies and thus cause in case of such variation of the intensity of the impinging light operation of the corresponding second removing means, each of said photoelectric cells being arranged and constructed so as to be influenced by light intensity variations within a square-shaped surface portion forming part of that second strip-shaped surface portion of said object which corresponds to that second operating means which is actuated by that second actuating means which includes the respective photoelectric cell; and influencing means having a light intensity varying effect and adapted to be removably provided on said object within any one of said plurality of square-shaped surface portions.

6. A conveyor system comprising in combination a vertical conveyor; a plurality of first removing means arranged spaced from each other along said vertical conveyor so that each of said first removing means is adapted to remove an object transported by said vertical conveyor from the same; a plurality of horizontal conveyors each associated with one of said first removing means and adapted to receive an object transported by said vertical conveyor when it is removed by the corresponding first removing means from said vertical conveyor; a plurality of photoelectrically influenced and actuated first operating means each associated with one of said first removing means so as to be adapted to operate the same; a plurality of second removing means arranged along each of said horizontal conveyors spaced from each other and each adapted to remove said transported object from the same; a plurality of photoelectrically influenced and actuated second operating means each associated with one of said second removing means so as to be adapted to operate the same; a plurality of indicating square-shaped surface portions on said object each of which forms part of one of a plurality of first strip-shaped surface portions each corresponding to one of said first operating means and being parallel to said vertical conveyor and forms also part of one of a plurality of second strip-shaped surface portions each corresponding to one of said second operating means and being parallel to said horizontal conveyors, each of said square-shaped surface portions thus corresponding to one of said first removing means and one of said second removing means; and influencing means having a light intensity varying effect and adapted to be removably provided on said object within any one of said plurality of square-shaped surface portions so as to be adapted to photoelectrically influence and actuate first the corresponding first operating means and then the corresponding second operating means.

OCTAVIO JOSE ALVAREZ.

REFERENCES CITED

The following references are of record in the file of this patent:

UNITED STATES PATENTS

| Number | Name | Date |
| --- | --- | --- |
| 1,804,153 | Cowley | May 5, 1931 |
| 1,870,583 | Olson | Aug. 9, 1932 |
| 1,937,303 | Worrall | Nov. 28, 1933 |
| 1,992,686 | Anderson | Feb. 26, 1935 |
| 1,992,687 | Anderson | Feb. 26, 1935 |